US010471399B1

(12) United States Patent
Hellbusch

(10) Patent No.: US 10,471,399 B1
(45) Date of Patent: Nov. 12, 2019

(54) BRINE MAKER

(71) Applicant: James A. Hellbusch, Columbus, NE (US)

(72) Inventor: James A. Hellbusch, Columbus, NE (US)

( * ) Notice: Subject to any disclaimer, the term of this patent is extended or adjusted under 35 U.S.C. 154(b) by 0 days.

(21) Appl. No.: 16/193,510

(22) Filed: Nov. 16, 2018

(51) Int. Cl.
*B01D 11/02* (2006.01)
*B01F 1/00* (2006.01)
*B01F 15/02* (2006.01)

(52) U.S. Cl.
CPC ........ *B01F 1/0033* (2013.01); *B01F 15/0235* (2013.01); *B01F 15/0254* (2013.01); *B01F 2001/0088* (2013.01); *B01F 2215/008* (2013.01)

(58) Field of Classification Search
CPC .......................... B01F 1/0033; B01F 15/0254; B01F 15/0235; B01F 2001/0088; B01F 2215/008
See application file for complete search history.

(56) References Cited

U.S. PATENT DOCUMENTS 1,642,445 A 9/1927 Jacobson
1,839,532 A 1/1932 Calhoun
1,989,416 A 1/1935 Hartman
2,024,830 A * 12/1935 McCann .................. B01F 1/00 23/299
3,072,387 A 1/1963 Heise
3,123,445 A * 3/1964 Heath .................. B01F 1/0016 210/172.2
3,419,223 A 12/1968 Morin
3,833,123 A 9/1974 Walker
4,116,640 A * 9/1978 Leverenz ............. B01F 1/0016 210/323.2
4,258,011 A 3/1981 Prazmowski
4,411,778 A 10/1983 Venable
4,462,511 A 7/1984 Fulmer et al.
4,481,110 A * 11/1984 Shannon .............. B01F 1/0033 210/199
4,510,114 A 4/1985 Nelson
4,807,854 A 2/1989 Mitchell
4,863,277 A 9/1989 Neal et al.
5,082,555 A 1/1992 Read
5,110,366 A 5/1992 McGregor
5,374,119 A * 12/1994 Scheimann .............. B01F 1/00 137/268
5,474,241 A 12/1995 Kennedy
5,775,237 A 7/1998 Reilly et al.
(Continued)

*Primary Examiner* — Regina M Yoo
(74) *Attorney, Agent, or Firm* — Dennis L. Thomte; Thomte Patent Law Office LLC

(57) ABSTRACT

A brine maker including a hopper having upper and lower ends with a receiving tank positioned below the hopper. The forward end of the receiving tank has an opening formed therein. An elbow fitting is positioned in the opening in the forward end of the receiving tank and is welded to the forward end of the receiving tank. The elbow fitting includes a vertically disposed hollow upper portion which is positioned in the receiving tank and a horizontally disposed hollow lower portion which is positioned in the opening in the forward end of the receiving tank. The horizontally disposed hollow lower portion of the elbow fitting is fluidly connected to a pump. A shield is secured to the inner side of the forward end of the receiving tank above the upper end of the vertically disposed hollow upper portion of the elbow fitting.

2 Claims, 8 Drawing Sheets

(56) References Cited

U.S. PATENT DOCUMENTS

| | | | | |
|---|---|---|---|---|
| 5,819,776 | A | 10/1998 | Kephart | |
| 5,983,908 | A | 11/1999 | Bradley | |
| 6,068,200 | A | 5/2000 | Kime | |
| 6,165,323 | A | 12/2000 | Shearer | |
| 7,186,390 | B1 | 3/2007 | Hellbusch et al. | |
| 7,879,234 | B2 * | 2/2011 | Barani .................... | C02F 1/688 210/167.11 |
| 2009/0188434 | A1 * | 7/2009 | McMullen ............. | A01K 39/02 119/72 |

* cited by examiner

BRINE MAKER

BACKGROUND OF THE INVENTION

Field of the Invention

This invention relates to devices for dissolving solid material into a brine liquid and more particularly to a brine maker that can be efficiently operated, cleaned, and maintained. Even more particularly, this invention relates to a means for preventing the clogging of the discharge line which connects the receiving tank thereof to the fluid pump of the invention.

Description of the Related Art

Salt brine production systems, also known as brine makers, have been used for hundreds of years in many different industries and applications. For example, several state road departments spray liquids, including salt brine, onto road surfaces before winter storms. They also spray these liquids onto dry salt-sand mixtures just before the mixtures are spread onto the roadways. Both methods, if done properly, have proved to be successful in de-icing roads and preventing road surfaces from freezing in the first place.

The general method for making salt brine has not changed over the years. In a downward flow brine maker, salt is loaded into a salt hopper, which is placed directly above a brine hopper. A salt screen is disposed between the salt hopper and brine hopper to retain the salt inside the salt hopper. Water is introduced to the salt hopper and dissolves the salt, forming the brine, which flows downward into the brine or receiving hopper. The brine collects in the brine hopper until it is later pumped into a holding tank. This basic brine maker design suffers from one key deficiency; clean-out is difficult and time-consuming. To properly clean the brine maker, the operator must, customarily, climb a ladder placed alongside the brine maker and physically enter the salt hopper to shovel the debris into a loader over the walls of salt hopper bucket and manually haul each bucket of debris out of the salt hopper. Thereafter, the operator could scrub the inside of the hopper and the upper surface of the salt screen. Access to the interior of the brine hopper and lower surface of the salt screen is typically gained by manually removing the brine hopper from the system. The time and resources spent on cleaning the brine maker are costly and bothersome.

A routine and thorough cleaning of the brine maker is necessary because many state road departments use standard rock salt, which is usually quite dirty, to make their brine. Some states allow up to 10% debris/dirt in their specifications for rock salt. The debris and dirt collects in both the salt hopper and the brine holding tank. Many operators delay cleaning their brine makers because it takes too long and requires valuable resources. However, when the brine makers are not regularly cleaned, the speed and efficiency of the brine production process is greatly reduced. Eventually, the system begins to back up. The operator is usually unaware of the problem until the fluid has completely filled the salt hopper and begins to overflow. Clean-up at that point is made extremely difficult. Accordingly, the operator must choose between the excessive time and work of cleaning the brine maker and reducing the speed and efficiency that they are capable of producing brine.

One previous attempt at making a brine maker that was easy to clean provided a removable salt hopper. A bracket was welded to the salt hopper so that the operator could couple his front end loader to the salt hopper. The operator was then able to remove the salt hopper and drive it to a particular location and dump the debris out of the salt hopper. While this brine maker concept was an improvement over previous brine makers as far as clean-out is concerned, it still suffered from two key flaws. First, the operator would have to disconnect the bucket from his front end loader before attaching the loader to the removable salt hopper. This consumes a lot of time, especially when trying to align the loader pins with the salt hopper bucket. After the operator has then placed the removable salt hopper back onto the brine maker, he must re-attach the bucket to the loader in order to add more salt to the salt hopper. The operator must also disconnect and reconnect the liquid inlet lines to the removable salt hopper. Moreover, silt still collects in the brine hopper, and there is no easy way to clean the silt out. If the silt is not cleaned out, suspended solids will collect in the brine storage tanks and silt will eventually clog the suction port that leads to the brine discharge pump.

Another prior art brine maker design provided a brine hopper that was pivotally connected to a frame that supported the brine maker, adjacent to the lower end of the salt hopper. Accordingly, the brine hopper could be pivoted down and away from the salt hopper so that silt and other debris could be manually removed. The design further incorporated a complex hydraulic assembly that could tip the entire salt hopper forward and away from the frame until its sides were at or beyond horizontal. In this position, the operator could have access to the interior of the salt hopper and the salt screen, which was permanently fixed at the bottom thereof, for cleaning and maintenance. The hydraulic assembly further provided a means for selectively pivoting the brine hopper between open and closed positions. While this design improved the ease with which brine makers could be cleaned, it too had several shortcomings. First, the complexity of the design and hydraulics system increased the unit's costs and manufacturing time. Second, the unit required a greater working area to pivot the salt hopper. The pivoting salt hopper further complicated the engineering and maintenance of the fluid inlet lines. Moreover, cleaning and maintenance of the salt screen and brine hopper were still somewhat cumbersome.

Another shortcoming of prior art brine makers includes their method of introducing water to the salt load in the salt hopper. In these designs, water is piped to the top of the salt hopper. The water then enters the salt hopper via one or more spray bars that extend horizontally along the sides of the salt hopper. Small holes are drilled along the length of the spray bars to provide a uniform spray pattern. As the water exits the spray bars, it is directed at a fixed location into the salt load. However, when the salt is dumped into the hopper, it creates a natural cone-shape. Therefore, the even horizontal spray effectively strikes the salt load in the center, but the sides of the spray are fired ineffectively into the opposite side of the salt hopper. The salt load dissolves more efficiently when it is directly impacted by the water spray. The shortcomings of this design are only accentuated as the salt load decreases in size and the fixed water stream eventually begins firing directly over the salt load.

In U.S. Pat. No. 7,186,390, which is owned by the assignee of the current invention, the invention provided a brine maker which efficiently dissolves solid material and was easily to clean and maintain without increasing the cost and complexity of manufacture. Although the brine maker of U.S. Pat. No. 7,186,390 has met with considerable commercial success, it has been found that sediment may clog or plug the inner end of the discharge line which extends from the receiving tank to the pump.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The brine maker of the present invention efficiently produces liquid compounds and is easy to clean and maintain. Salt is loaded into the salt hopper using a front end loader or similar machine. Fluid is provided to positionable spray bars, disposed within the salt hopper. As the fluid stream exits the spray bars and dissolves the salt, or other dissolvable material, it passes through a solids screen that filters unwanted particulate away from the “brine.” The brine temporarily collects in a receiving tank, positioned below the salt hopper and solids screen. The brine can then be pumped, by way of a discharge line which extends from the lower end of the receiving tank to a pump, to remote storage tanks or pumped back into the salt hopper, via the spray bars, to increase the concentration of the brine. The inner end of the discharge line has an elbow fitting mounted in a hole or opening in the receiving tank with the upper inner end of the elbow fitting being positioned within the receiving tank above the lower end of the receiving tank to prevent the inlet end of the line from being clogged. The upper end of the elbow fitting is positioned above any sediment in the receiving tank. A deflector shield is also positioned at the inner side of the receiving tank above the upper end of the elbow fitting.

U.S. Pat. No. 7,186,390, which issued on Mar. 6, 2007, which has been assigned to DuoLift of Columbus, Nebr., provided a brine maker that efficiently dissolves solid material and is easy to clean and maintain without increasing the cost and complexity of manufacture. The brine maker of U.S. Pat. No. 7,186,390 has been and is commercially successful. However, in the brine maker of U.S. Pat. No. 7,186,390, the inlet end of the discharge line which extends from the receiving tank to a pump could become clogged or plugged with sediment.

Accordingly, it is one of the important objects of the present invention to provide an improved brine maker that is easy and efficient to operate, as well as simple and quick to clean and maintain.

A further object of the invention is to provide a means for preventing the inlet end of a discharge line which extends from the receiving tank to a pump from becoming clogged with sediment.

These and other objects will be apparent to those skilled in the art

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The system for producing liquid compositions of the present invention will be generally referred to as the brine maker 10. It will be understood by one of ordinary skill in the art that, while the brine maker 10 herein will be described as producing salt brine, a wide range of liquid compositions could be made using the present device with few, if any, modifications. Inasmuch as the instant invention is ideally suited for use with a brine maker as described in U.S. Pat. No. 7,186,390, the ’390 patent will be described in detail.

Figure 6:
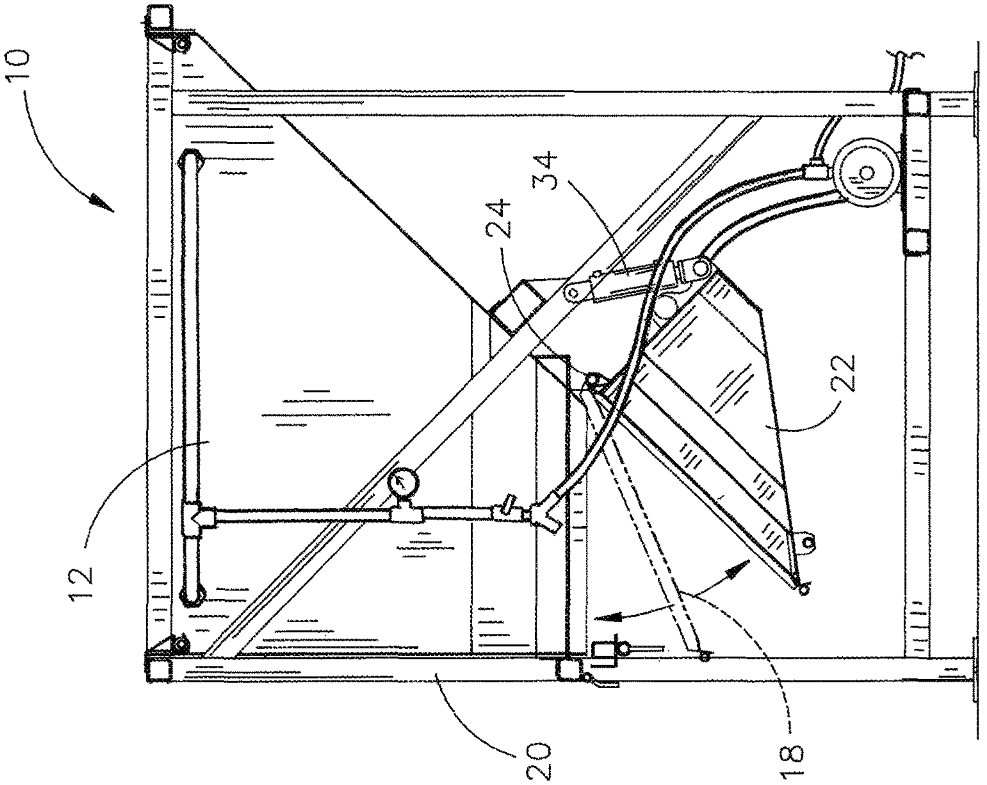
FIG. 6 illustrates the pivoting motion of the salt screen of the brine maker when the brine hopper of FIG. 5 is in its open position.
Figure 5:
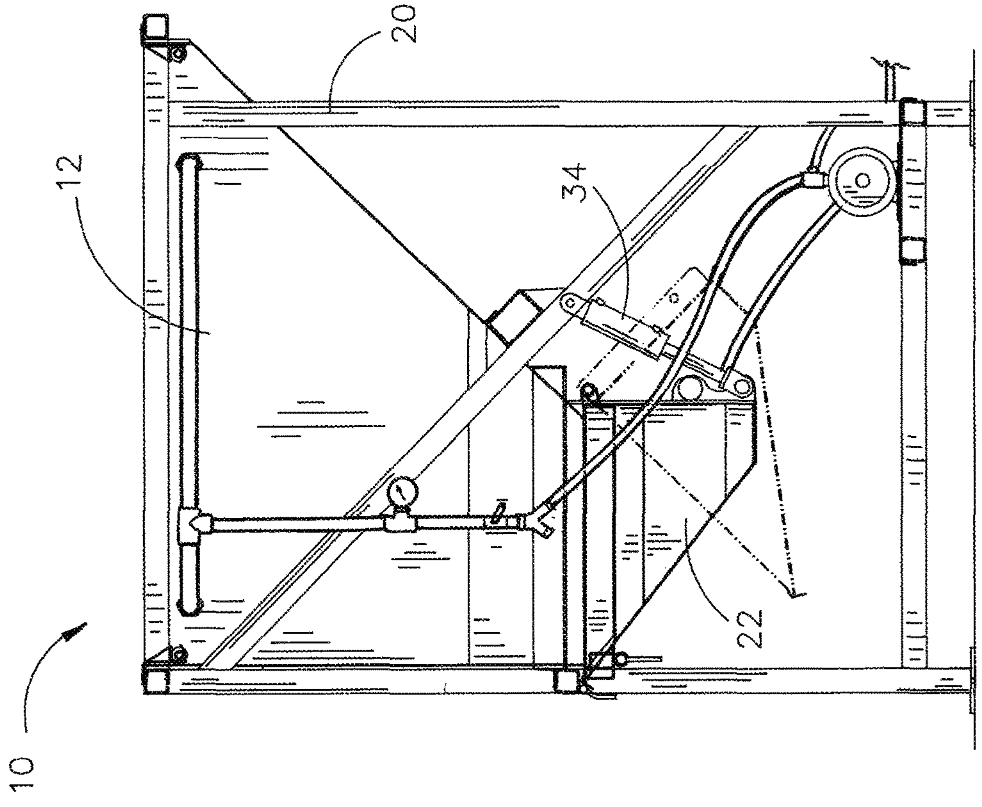
FIG. 5 illustrates the pivoting motion of the brine hopper of the brine maker between open and closed positions.

The brine maker 10 of U.S. Pat. No. 7,186,390 for producing salt brine, shown in FIGS. 1 through 6, 10, and 11, is generally provided with a salt hopper 12, having at least a first opening 14 for receiving soluble materials, such as rock salt, and a second opening 16 for the passage of the liquid composition through a solids screen 18, which forms the base of salt hopper 12. The salt hopper 12 is secured to a frame 20 adjacent the upper end thereof. A brine hopper, or receiving tank 22, having an open top and closed bottom, is operatively and pivotally coupled to salt hopper 12 at hinge 24. Accordingly, receiving tank 22 can be pivoted between a closed position and an open position as shown in FIGS. 5 and 6. The open top of receiving tank 22 should be sized to correspond to the dimensions of the second opening 16 of salt hopper 12 so that fluids may pass cleanly from salt hopper 12 into receiving tank 22.

Figure 2:
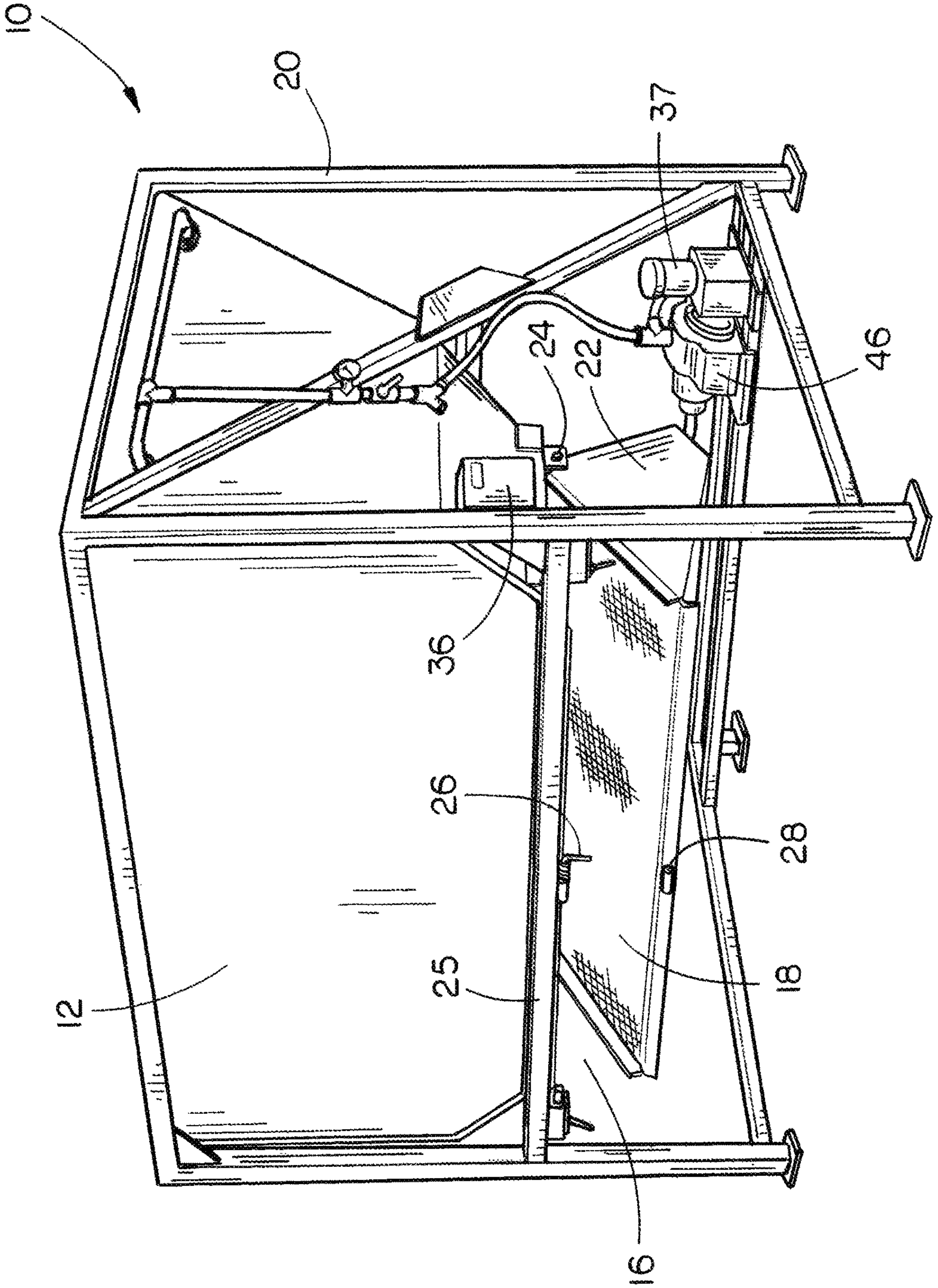
FIG. 2 is a front perspective view of the brine maker of the present invention.
Figure 4:
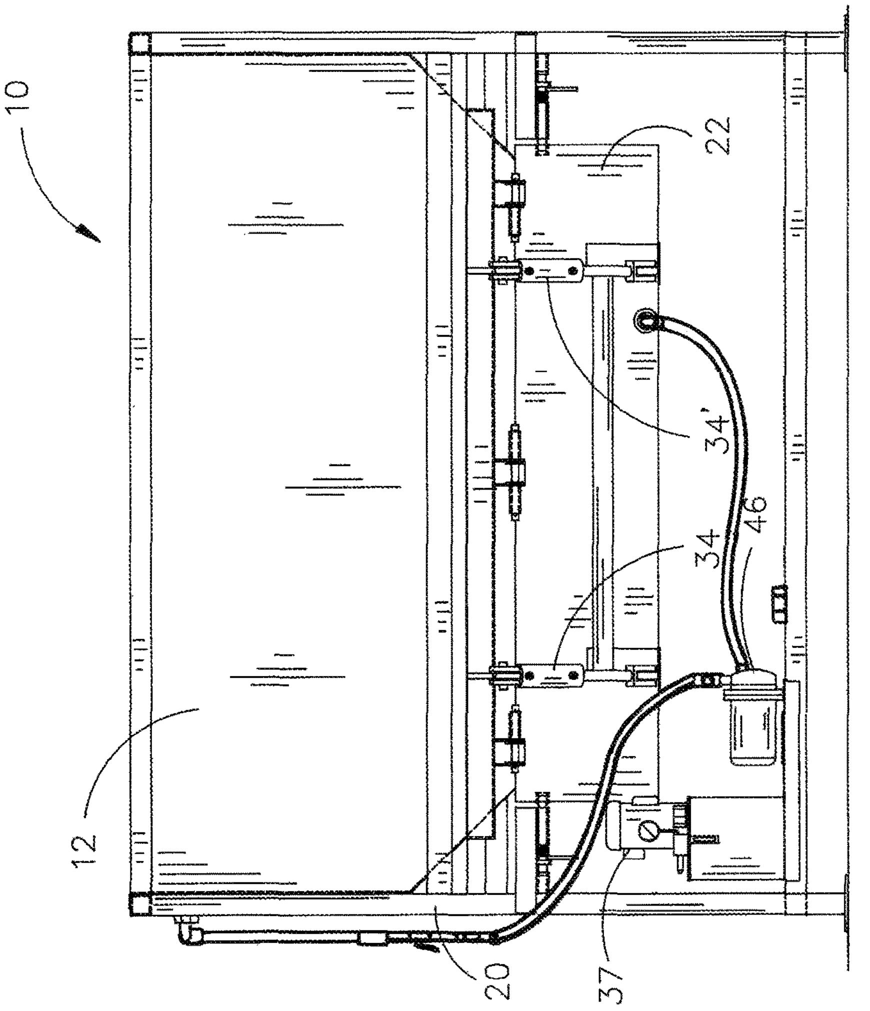
FIG. 4 is a rear elevation view of the brine maker of the present invention.
Figure 3:
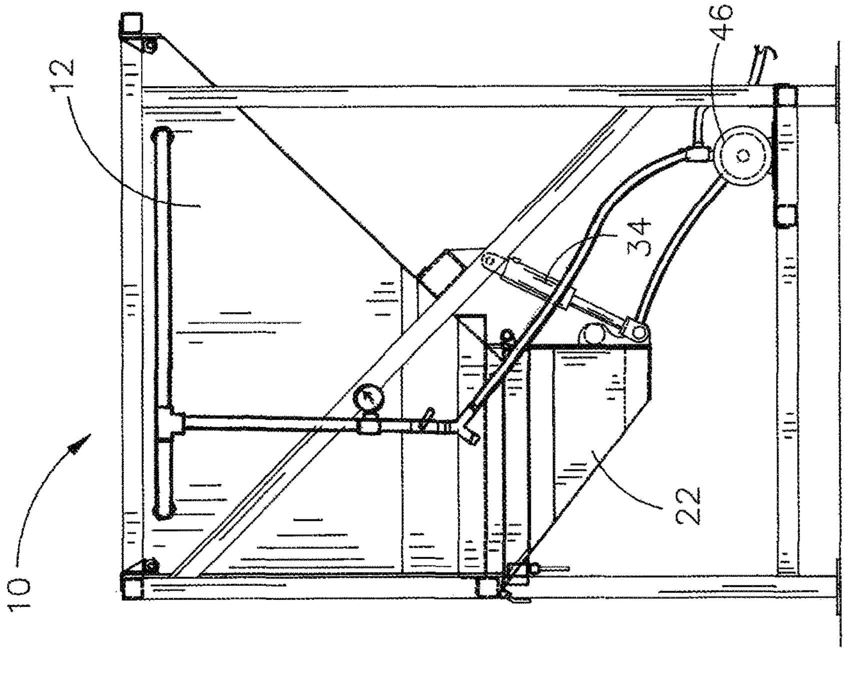
FIG. 3 is side elevation view of the brine maker of the present invention.

The frame 20 should be of sturdy but simple construction. While it is preferred that carbon steel is used for the component parts of frame 20, it is contemplated that a range of other metals or polymers could be used. Frame 20 has an upper end and a lower end comprised of horizontal frame members. The upper and lower ends of frame 20 are connected by a plurality of vertical and diagonal frame members. Frame 20 is provided with a removable frame member 25. Frame member 25 can be bolted into a horizontal position adjacent the second opening 16 of salt hopper 12, as shown in FIG. 2. In this position, frame member 25 serves to stabilize frame 20 and locate solids screen retaining pin 26, and the receiving tank pins 30 for the securement of solids screen 18 and receiving tank 22. This position also allows the bucket of a front end loader to be positioned between the brine maker 10 and the floor, for cleaning functions discussed below. When the brine maker 10 must be moved, frame member 25 can be bolted into a horizontal position in planar harmony with the horizontal supports adjacent the lower end of frame 20. In this position, a forklift can easily lift and transport the brine maker 10 to a new location.

Figure 1:
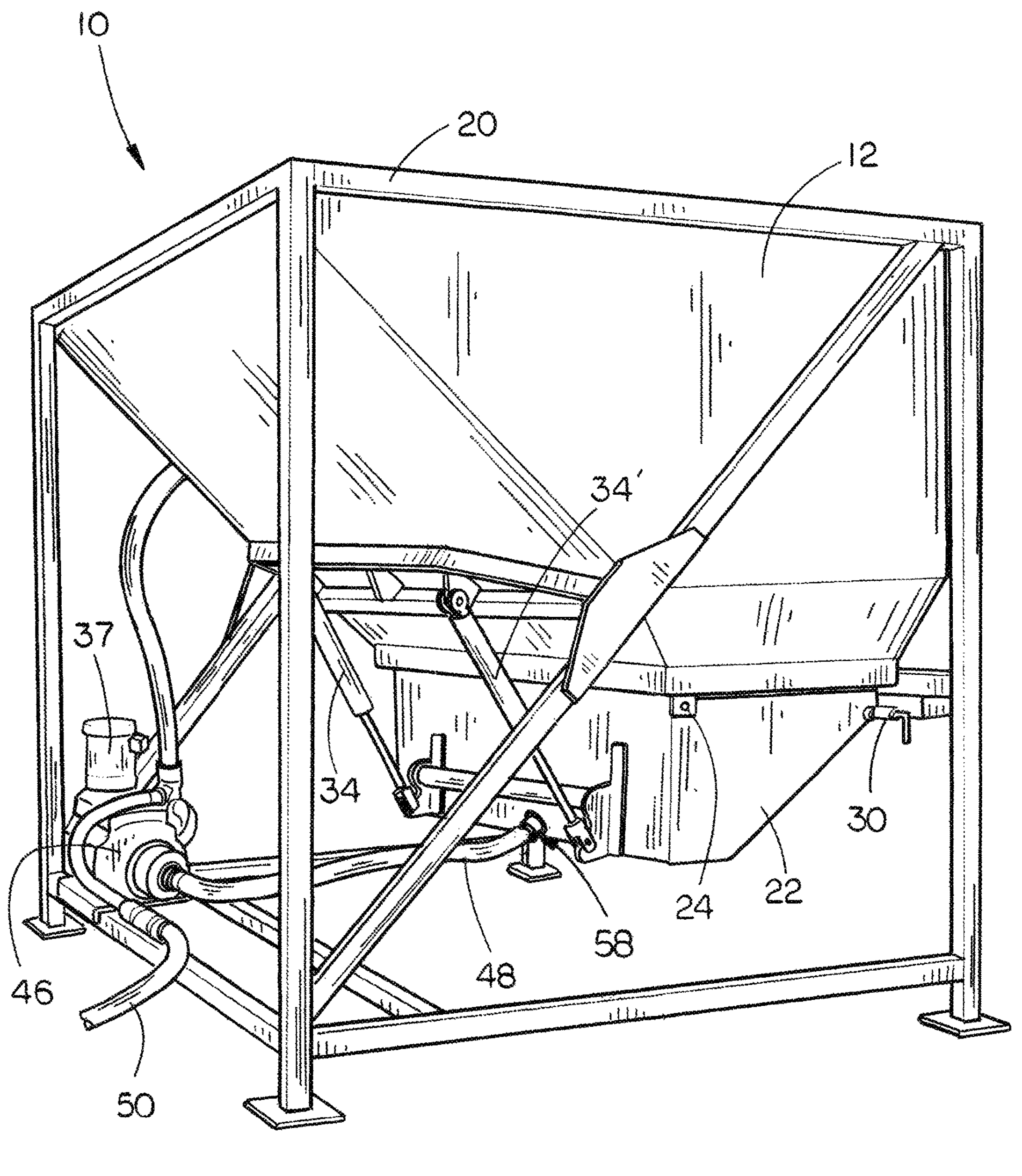
FIG. 1 is a rear perspective view of the brine maker of the present invention.
Figure 1A:
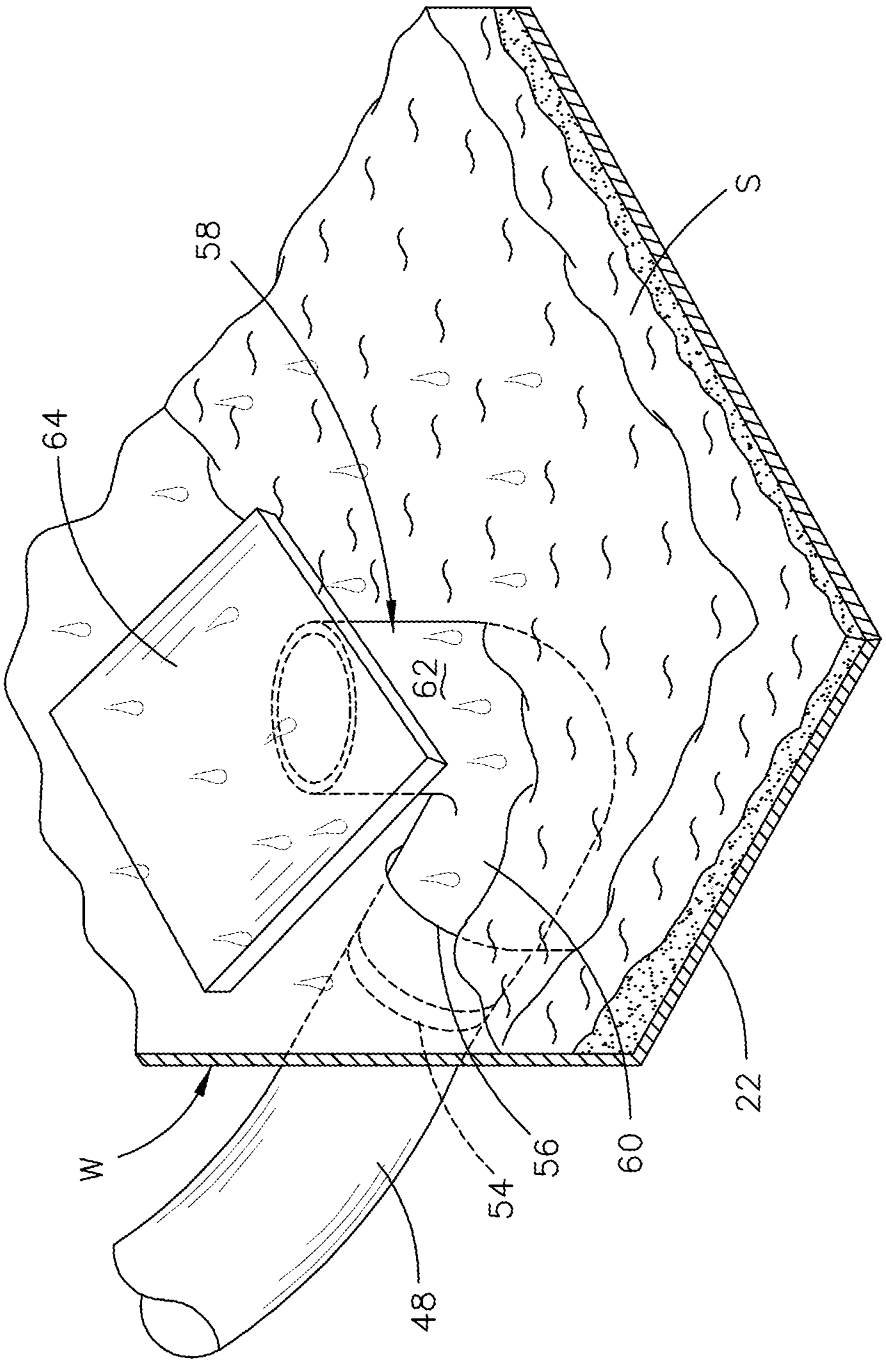
FIG. 1A is a partial perspective view of structure which prevents the clogging or plugging of the brine discharge line.
Figure 9:
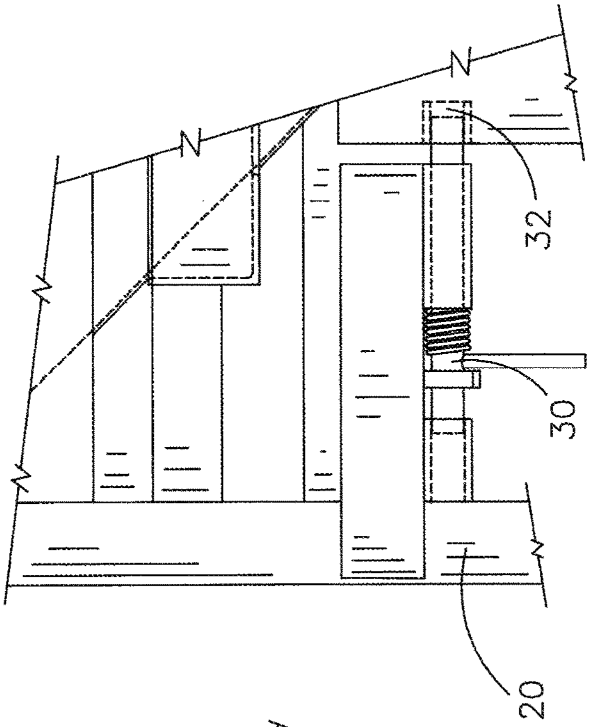
FIG. 9 is a front view of the brine hopper retaining bolt of the brine maker of the present invention.
Figure 8:
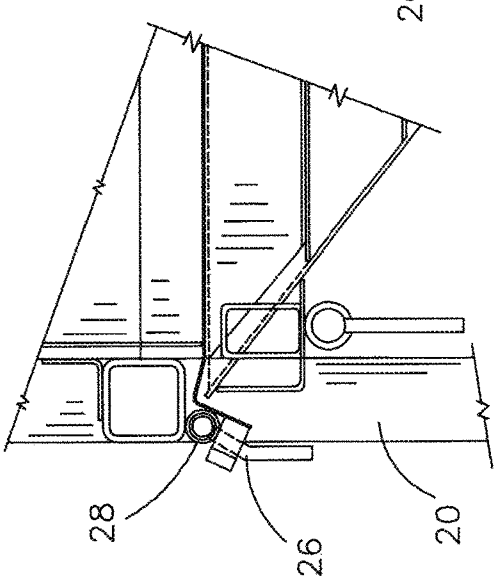
FIG. 8 is a side view of the salt screen and brine hopper retaining bolts of the brine maker of the present invention.
Figure 7:
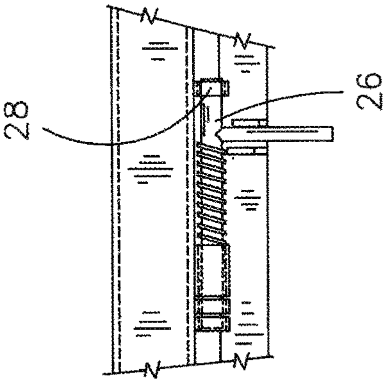
FIG. 7 is a front view of the salt screen retaining bolt of the brine maker of the present invention.
Figure 10:
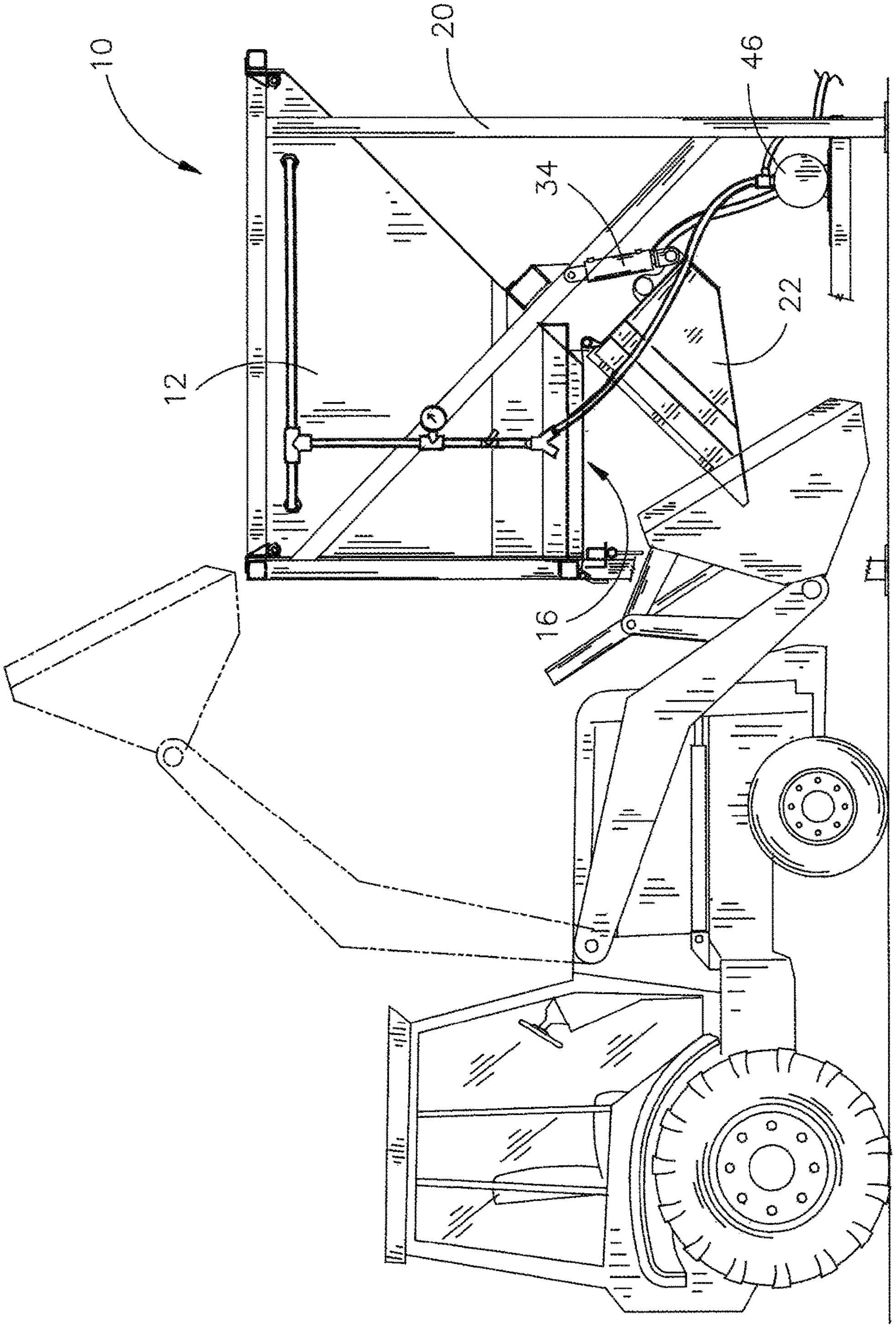
FIG. 10 illustrates the ease with which a front-loader can selectively load and unload solid material from the brine maker.

Solids screen 18 is preferably formed from a stainless steel screen but could be formed from any corrosion-resistant perforated material. Solids screen 18 is pivotally connected to salt hopper 12 and receiving tank 22 at hinge 24. Accordingly, when receiving tank 22 is in its open position, solids screen 18 can be freely pivoted to any point along the arc extending between the second opening 16 of salt hopper 12 and the open top of receiving tank 22 as shown in FIG. 6. A solids screen retaining pin 26 and collar 28 are disposed at the forward edge of solids screen 18, for selectively, manually locking solids screen 18 in a position closely adjacent the second opening 16 of salt hopper 12. Accordingly, when the solids screen retaining pin 26 is secured within collar 28, as shown in FIG. 7, and the receiving tank 22 is moved into its open position, the operator is provided with easy access to the underside of solids screen 18 and the interior compartment of receiving tank 22. Similarly, when the solids screen retaining pin 26 is disengaged from collar 28, as shown in FIG. 2, the solids screen 18 will pivot downwardly with receiving tank 22 when it is moved into its open position. In this position, the operator is provided with easy cleaning and maintenance access to the upper surface of solids screen 18 and the interior of salt hopper 12. At least two receiving tank retaining pins 30 and receptacles 32 are provided for manually locking the receiving tank 22 in its closed position as shown in FIGS. 1 and 9.

Figure 11:
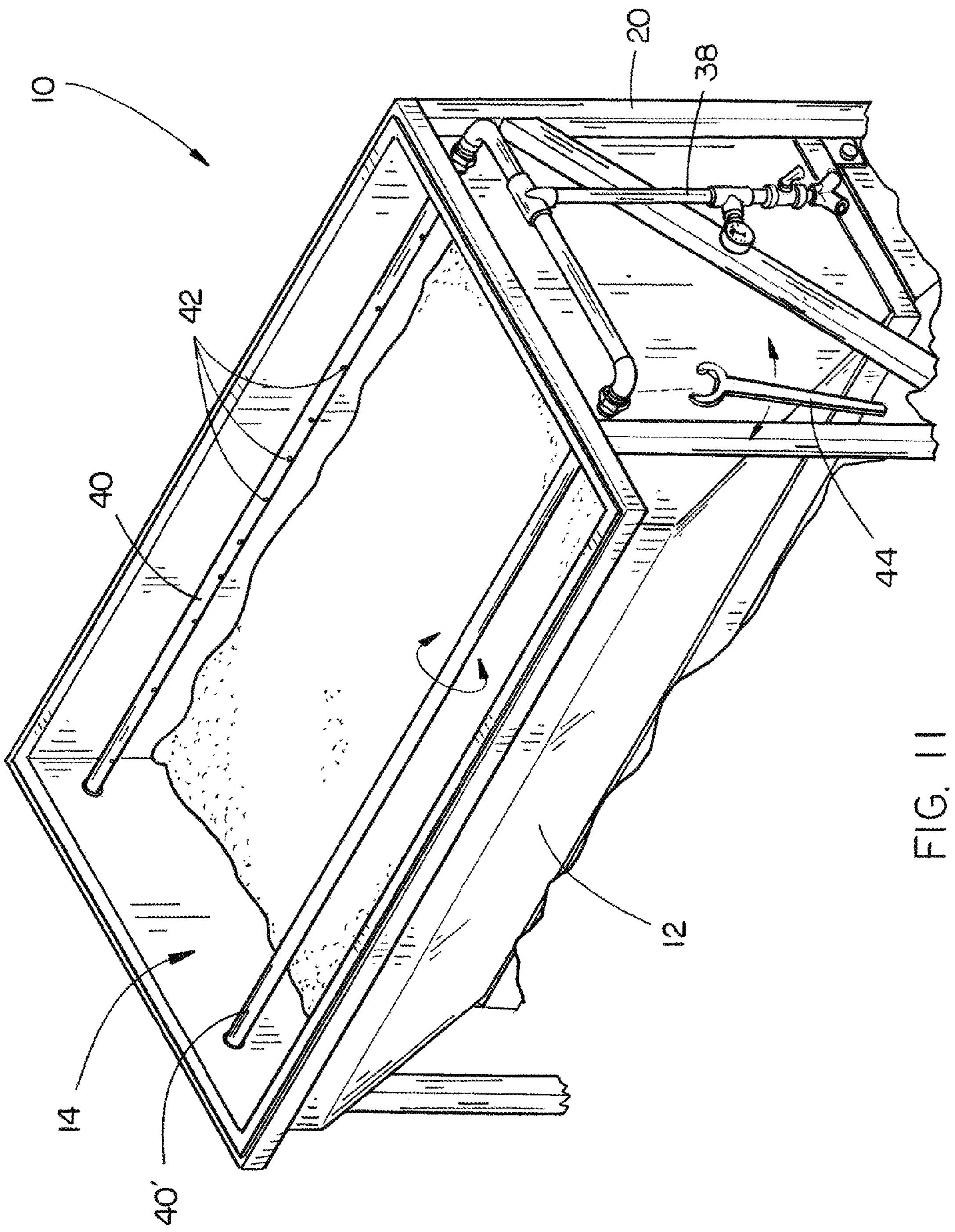
FIG. 11 is an upper perspective view of the brine maker of the present invention illustrating the rotational motion of the forward and rearward spray bars.

A hydraulic assembly is provided with cylinders 34 and 34', a control panel 36, and a hydraulic pump 37. The hydraulic assembly allows the user to selectively move the receiving tank 22 between its open and closed positions automatically. It is contemplated that the hydraulic assembly may have one or more cylinders and a varying degree of complexity as the particular use requires. A fluid inlet line 38 extends to the top of salt hopper 12 where it is connected to two spray bars 40 and 40'. Fluid inlet line 38 is preferably provided with two couplings, as shown in FIG. 11. The first coupling receives fresh water directly from a common city water line. The pressure provided by typical city water supplies is usually sufficient to operate the system. However, it is contemplated that a pump or similar means could be used for water services that are not under pressure or lack the desired pressure level. The second coupling is used to return salt brine to the salt hopper for reasons discussed below.

While it is contemplated that one or more spray bars could be used in the present application, it is preferred that two spray bars be used to provide opposing streams of water for dissolving the salt load within salt hopper 12. Spray bars 40 and 40' are provided with a plurality of openings 42 along the length thereof. To provide for a greater efficiency in dissolving salt loads, which tend to be generally conical in shape when dumped into the hopper 12 from above, the spacing between the openings 42 are varied so that the holes proximate the center point of the spray bars 40 and 40' are closer to one another than the holes proximate the ends of spray bars 40 and 40'. Moreover, the holes 42 should vary in diameter. Particularly, the diameter of the holes 42 should gradually increase in size as their distance to the midpoint of the spray bars 40 and 40' decreases. Accordingly, the larger holes will be positioned near the center of the spray bars 40 and 40'. Therefore, as fluid is pumped through the spay bars 40 and 40', the spray that exits the center holes 42 will have a greater volume and concentration than the spray pattern exiting from the ends of spray bars 40 and 40'.

Spray bars 40 and 40' are rotatably mounted so that the operator can vary the vertical pitch of the fluid spray that is being directed at the salt load. This allows the operator to optimize the spray stream, whereas a fixed position stream would tend to be aimed either too high or too low, depending on the volume of salt in the load. The rotation of spray bars 40 and 40' can either be achieved manually using a wrench 44 or they can be adjusted automatically using an electric or hydraulic pump (not shown).

In an alternate embodiment, solid stream nozzles (not shown) having an oscillating spray pattern could be used in place of, or in combination with, the holes 42. The use of such oscillating solid stream nozzles will tend to dissolve the salt load more quickly since the oscillation of the nozzles will impact a greater surface area of the salt load at one time.

A fluid pump 46, as illustrated in FIG. 1, serves a dual role. When making salt brine, fluid pump 46 delivers recycled salt brine that is received from line 48, which connects the receiving tank 22 to the fluid pump 46, to fluid inlet line 38 and spray bars 40 and 40', when it is determined that the salinity level of the brine being produced is insufficient. When it is determined that the salt brine is at the appropriate salinity level, the pump delivers the salt brine to virtually any remote holding tank or applicator truck via line 50.

A float switch (not shown) is strategically placed on the inside of salt hopper 12 to detect the occurrence of a fluid overflow, due to a plugged solids screen, a discharge pump failure, or other similar malfunction. Once the float switch has detected the rising water level, a warning is provided to the operator to manually shut down the system. It is further contemplated that the float switch could be directly coupled to an automatic shut-off valve incorporated in fluid inlet line 38 to stop the fluid flow. Sight windows 52 are provided in the sides of salt hopper 12 to allow the operator to visually detect abnormalities in the fluid levels independent from the function of the float switch. The sight windows 52 further allow the operator to view the fluid stream as the spray bars 40 and 40' are rotated to their various positions. The sight windows 52 further provide an element of safety in that the operator can view the fluid stream from ground level rather than scaling the side of the brine maker during brine production.

The inner end of line 48 has a threaded portion formed therein. The threaded portion of the inner end of line 48 will be designated by the reference numeral 54. Wall W of the receiving tank 22 has an opening 56 formed therein at the lower end thereof. The numeral 58 refers to an elbow fitting which is positioned in opening 56 and welded to the wall W of receiving tank 22. Elbow fitting 58 includes a horizontally disposed portion 60 and an upstanding portion 62. The horizontally disposed portion 60 of elbow fitting 58 is positioned in opening 56 as seen in the drawings. The upstanding portion 62 of elbow fitting 58 is positioned at the inner side of wall W so that the upper open end of upstanding portion 62 is positioned above the bottom of receiving tank 22 and above any sediments on the bottom of receiving tank 22. The fact that the upper end of the upstanding portion 62 is positioned above the sediments on the bottom of receiving tank 22 prevents the inner end of line 48 from becoming plugged. An inclined shield or wall 64 has its upper end welded to the inner side of wall W above the upper end of the upstanding portion 62 of elbow fitting 58 so as to extend downwardly and outwardly from wall W above the upper end of upstanding portion 62 of elbow fitting 58 to prevent particles of salt or sediment from falling downwardly into the upstanding portion 62 of elbow fitting 58 while permitting the brine solution to pass into the open upper end of the upstanding portion 62 of elbow fitting 58 and thence to the pump 46.

In the drawings and in the specification, there have been set forth preferred embodiments of the invention, and although specific items are employed, these are used in a generic and descriptive sense only, and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A system for producing liquid compositions, comprising:

a hopper having an upper end, a lower end, an inner surface, an outer surface, a forward end and a rearward end;

at least one elongated spray bar mounted in said hopper adjacent said upper end thereof;

said at least one elongated spray bar having a plurality of holes disposed therein to allow fluid to escape therefrom;

a fluid inlet line operatively fluidly connected to said at least one elongated spray bar for supplying fluid to said at least one elongated spray bar;

a receiving tank having an open upper end, a closed lower end, a forward end with inner and outer sides and a rearward end;

said receiving tank having a first opening formed in said forward end thereof adjacent said closed lower end thereof;

said lower end of said hopper being in open communication with said open upper end of said receiving tank;

said receiving tank being operatively pivotally movable with respect to said hopper so that said receiving tank may be selectively pivoted between open and closed positions;

a hydraulic assembly operatively connected to said receiving tank to selectively move said receiving tank between said open and closed positions;

a solids screen, having an upper surface and a lower surface, positioned between said lower end of said hopper and said open upper end of said receiving tank;

an elbow fitting having a vertically disposed hollow upper portion with an upper end and a lower end, and a horizontally disposed hollow lower portion, with an inner end and an outer end, which extends transversely from said lower end of vertically disposed hollow upper portion of said elbow fitting;

said vertically disposed hollow upper portion of said elbow fitting being positioned inwardly of said forward end of said receiving tank above said first opening in said forward end of said receiving tank;

said horizontally disposed hollow lower portion of said elbow fitting extending through said first opening in said forward end of said receiving tank;

said horizontally disposed hollow lower portion of said elbow fitting being secured to said forward end of said receiving tank;

a shield secured to said inner side of said forward end of said receiving tank which extends therefrom over said upper end of said vertically disposed hollow upper portion of said elbow fitting in a spaced manner;

a pump positioned remotely of said receiving tank; and a fluid line extending from said pump to said outer end of said horizontally disposed hollow lower portion of said elbow fitting whereby said pump may pump fluid from said receiving tank by way of said elbow fitting.

2. The system of claim 1 wherein said shield extends downwardly and rearwardly from said inner side of said forward end of said receiving tank.

* * * * *